April 26, 1960 K. L. KOCMANEK 2,934,745

REMOTE FREQUENCY SELECTION SYSTEM

Filed Aug. 6, 1956 3 Sheets-Sheet 1

INVENTOR.
KARL L. KOCMANEK
BY Harry M. Saragovitz
ATTORNEY

April 26, 1960 K. L. KOCMANEK 2,934,745

REMOTE FREQUENCY SELECTION SYSTEM

Filed Aug. 6, 1956 3 Sheets-Sheet 2

INVENTOR.
KARL L. KOCMANEK
BY Harry M. Saragovitz
ATTORNEY

April 26, 1960 K. L. KOCMANEK 2,934,745

REMOTE FREQUENCY SELECTION SYSTEM

Filed Aug. 6, 1956

3 Sheets-Sheet 3

INVENTOR.
KARL L. KOCMANEK

BY Harry M. Saragovitz

ATTORNEY 2,934,745

REMOTE FREQUENCY SELECTION SYSTEM

Karl L. Kocmanek, Long Branch, N.J., assignor to the United States of America as represented by the Secretary of the Army Application August 6, 1956, Serial No. 602,477

7 Claims. (Cl. 340—147)

(Granted under Title 35, U.S. Code (1952), sec. 266)

The invention described herein may be manufactured and used by or for the Government for governmental purposes, without the payment of any royalty thereon.

The invention relates to frequency control systems and particularly to remotely controlled frequency selecting and adjusting systems.

One application of the invention is to the frequency adjustment of radio transmitting and receiving equipment located in an airplane, by the airplane pilot. The use of radio dials for this purpose is not very satisfactory, as it has been found in practice that many airplane pilots have difficulty in accurately reading frequency indications on scalar type indicators, and in precisely adjusting the tuning of the radio equipment on the basis of such readings. Other applications are to the frequency adjustment of radio communication equipment on airplanes, automobiles or other mobile vehicles from a distant control station; rapid channel changing in radar directors during enemy jamming; channel selection in signal receiving systems, e.g., those using crystal frequency selective devices; and channel selection in television systems.

A general object of the invention is to produce simply and economically accurate frequency or frequency channel selection, or frequency tuning adjustments, in such systems from a remote point.

A more specific object is to exactly select a particular frequency or frequency channel from a remote point with simple and economical circuit arrangements employing a minimum number of control wire connections between the controlled equipment and the control apparatus at the remote control point for a given number of selectable frequencies or frequency channels.

These objects are attained in accordance with the invention by the use of an impulse-controlled selector system similar to that used in automatic telephone dialing. This system is not only significantly simpler and cheaper than other types of remote selector systems used for similar purposes in the prior art, but also requires less overall space, is lighter in weight, less prone to error, easier to supervise, and requires for up to a billion or more selectable frequencies or frequency channels only three wires plus a ground return path and, in the case of a return impulse system, only six wires plus a ground return path, for the connections between the remote station and the controlled station.

A simple embodiment of an impulse-controlled selector system in accordance with the invention includes a dialing mechanism similar to the sending or calling dial used in automatic telephone systems, and two associated manual switches, at the remote control station. The dialing mechanism when operated in the usual manner by the operator at that station to actuate its "zero" or "number" contatcs will cause single direct-current impulses or a train of such impulses in number determined by the particular digit dialed, respectively, to be transmitted out over the wiring connections, which in this embodiment comprise three wire conductors plus a ground return, to the controlled station.

Switching equipment at the controlled station is controlled by the received impulses to set up the necessary connections to select any particular frequency or frequency channel, or combination of channels, in accordance with the number dialed by the operator at the remote control station. More specifically, this switching equipment includes one rotary stepping switch, to be referred to hereinafter as a "minor" switch, operable by each received impulse transmitted in response to the closure of the "zero" contacts of the dialing mechanism DM at the control station during the dialing of each of the consecutive digits of the dialed number, to step its wiper arm to respectively different contact positions, the function of which minor switch is to choose the particular power of ten, i.e., thousands, hundreds, tens, etc., required by the number dialed; and a plurality of other similar rotary stepping switches, to be referred to hereinafter as "major" switches, which are respectively operatively responsive to the received impulses produced by the dialing of different digits in the number dialed at the control station, transmitted through respectively different operated contact positions of the minor switch, to step their respective wiper arms to a switch contact position determined by the number of applied impulses, respectively representing a different one of the dialed digits, which contact positions through associated frequency control equipment select the desired frequency or channel.

One of the two manual switches at the remote control station is operated by the operator thereat just prior to the dialing of a number at that station, to cause an operating voltage to be applied over one of the three wire conductors to the operating electromagnet of the minor switch at the controlled station causing the operation of that switch to its first contact position, the operation of the switch to its other contact positions being controlled by the received "zero" dialing impulses. The other manual switch at the remote control station, when operated by the operator thereat, causes operating voltages to be applied over a different one of the three wire conductors to the clearing electromagnets of all the rotary switches at the controlled station causing their release to return their respective wiper arms to the null position through the intermediary of associated springs.

A second embodiment of the invention differs from the first eombdiment described above merely in the addition of back reporting equipment at the remote control station controlled by the dialing and switching equipment at that station, for visibly indicating the dialing and switching operations which have been performed by the operator at the control station to send out current impulses to control the switching equipment at the other station.

A third embodiment of the invention differs from the first embodiment in the use of three additional wire conductors in the connections between the control and controlled stations, the use of additional equipment at the controlled station responsive to the operation of the several rotary switches thereat to send impulses back over the three additional wire conductors to the control station and the use of additional equipment at the control station responsive to the returned impulses to visibly indicate thereat the operating condition of the switches at the controlled station.

A better understanding of the various objects and features of the invention will be obtained from the following complete detailed description thereof when it is read in conjunction with the accompanying drawings in which.

Figure 1:
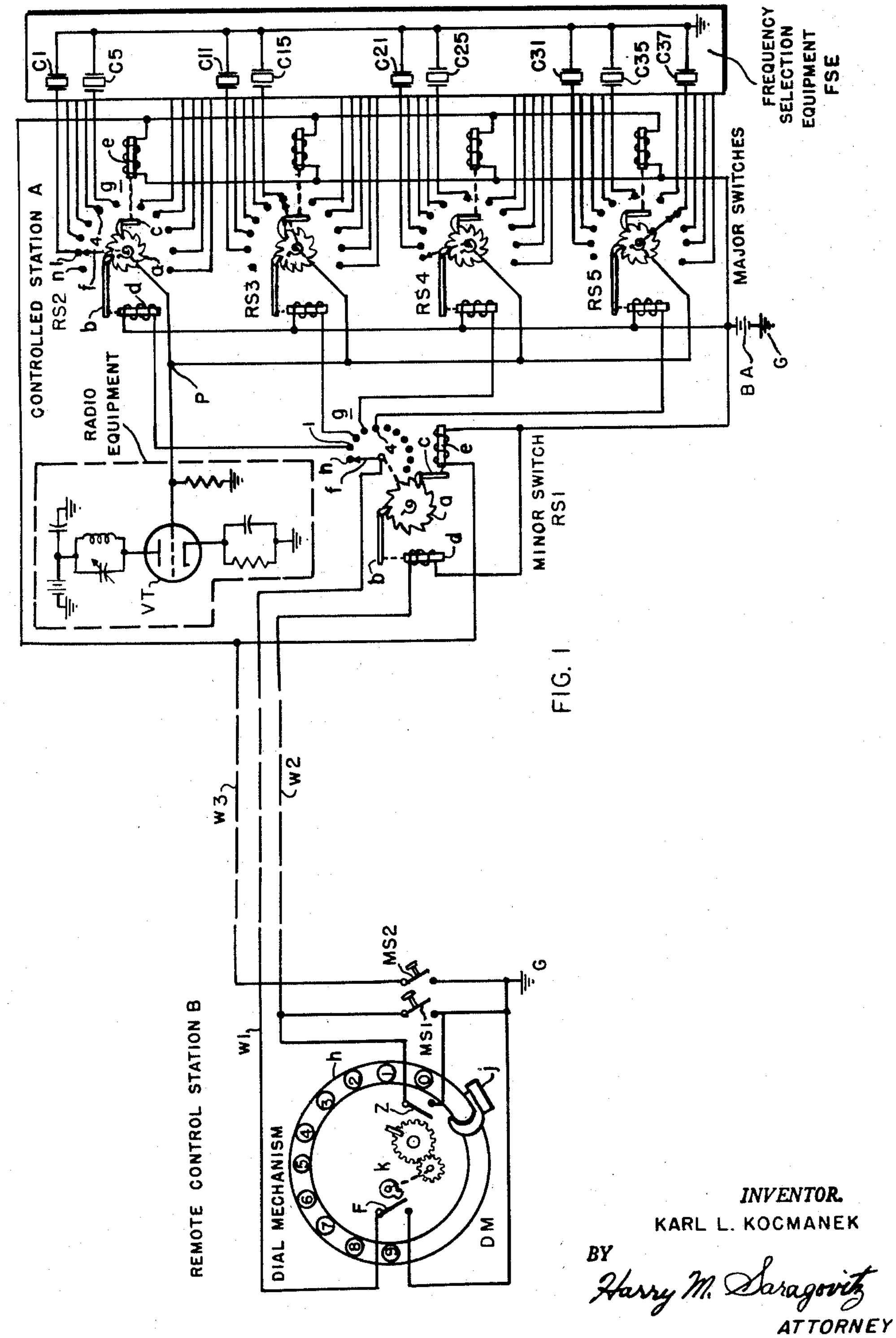
Fig. 1 shows schematically a "three-wire" impulse-controlled selector system for controlling the selection of particular frequencies, frequency channels, or combination of channels, from a remote point, embodying the invention.

In the embodiment of the invention shown in Fig. 1, three individual wire conductors W1, W2 and W3 and a common ground return G provide three transmission circuits between the controlled station A at which the switching equipment for selecting the desired frequencies or frequency channels is located, and a control station B relatively remote therefrom. The switching equipment at the controlled station comprises a plurality of like rotary stepping switches RS1, RS2, RS3, RS4, RS5 . . . , one of which, RS1, is a minor switch utilized for choosing the power of ten, i.e., thousands, hundred, tens, etc., required for the dialed number, and the others of which, RS2, RS3, RS4, RS5 . . . are major switches utilized for directly controlling the actual selection of frequencies or channels. As shown, the rotary stepping switches may be of the ratchet type, each including a spring-returned ratchet wheel *a*, a ratchet-pawl *b* for rotating the ratchet wheel, a holding pawl *c*, an operating electromagnet *d* and a clearing electromagnet *e*, which may be of the solenoid type, a wiper arm *f*, and a bank *g* of ten switching contacts arranged in an arc, including a null contact *n* and other contacts consecutively numbered 1, 2, 3, 4 . . . .

At the controlled station A, the first wire conductor W1 is connected directly to the wiper arm *f* of the minor switch RS1; the second wire conductor W2 is connected through the operating electromagnet *d* of minor switch RS1 to the positive terminal of the grounded battery BA; and the third wire conductor W3 is connected through the parallel-connected clearing electromagnets *e* of the minor switch RS1 and of the major switches RS2, RS3, RS4, RS5 . . . to the positive terminal of the grounded battery BA. The consecutive switching contacts 1, 2, 3, 4, on the contact bank *g* of minor switch RS1 are respectively connected through the operating electromagnet *d* of a different one of the major switches RS2, RS3, RS4, RS5 . . . to the positive terminal of the grounded battery BA. The consecutive switching contacts 1, 2, 3, 4, in the contact bank *g* of each of the major switches RS2, RS3, RS4, RS5 . . . are respectively connected directly to different frequency selective devices in the frequency selection network FSE one embodiment of which will be described later in connection with a description of the operation of the system of Fig. 1.

The apparatus at the remote control station B in the system of Fig. 1 includes a dialing mechanism DM similar to the calling dial used in automatic telephone systems for transmitting the digits of a wanted telephone number. This mechanism DM includes a rotatable finger hole dial *h* having ten holes therein numbered consecutively 0, and 1 to 9, respectively, a dial stop *j*, a set of "number" switching contacts F and a set of "zero" switching contacts Z so interconnected that when the operator at the station inserts his finger into the hole having a number corresponding to a particular digit 1 to 9 or 0 of a number which he desires to transmit, rotates the dial around to the stop *j* and then allows the dial to return to its original position by means of an associated spring (not shown), this will cause the contacts Z or F, respectively, to be momentarily closed once for the digit 0 to 1 and a number of times equal to the number of the dialed digit for the other digits. Also, the number contact F and the zero contacts Z are coupled by any suitable means, such as the cam and gear mechanism *k* illustrated diagrammatically in the drawing, so that for each number digit dialed the rotation of the dial *h* to a given position will also result in the momentary closing of the zero switching contacts Z of the dialing mechanism. The apparatus at the remote control station B also includes two manual switches MS1 and MS2, which may be of the "push" type.

At the remote control station B, the first wire conductor W1 is connected through the number contacts F of DM to ground; the second wire conductor W2 is connected through the zero contacts Z of DM to ground; the manual switch MS1 is connected in parallel with the zero contacts Z in the wire conductor W2; and the third wire conductor W3 is connected through the second manual switch MS2 to ground.

The frequency and frequency channel selecting system of Fig. 1 operates as follows:

As a preliminary safety measure, at the beginning of any operation, the manual switch MS2 must be pressed to make certain that all the rotary switches RS1, RS2 . . . RS5 . . . in the switching equipment at the controlled station A are back in their zero (null) positions. On closing MS2 an operating voltage is applied to the clearing electromagnets *e* of the minor switch RS1 and the major switches RS2, RS3, RS4, RS5 . . . over a circuit extending from the positive terminal of battery BA through the clearing electromagnets *e* of all these switches in parallel, and wire conductor W3 through the closed contacts of switch MS2 to ground and from ground back to the negative terminal of battery BA. This will cause both the holding pawls *c* and the ratchet-pawls *b* of these switches to be retracted allowing the wiper arms *f* of these switches, which are under spring tension, to return to the null contact position *n*. Following this, any frequency or channel, say that designated 1507, can be selected as follows:

First, the manual switch MS1 is pressed to cause an operating voltage to be applied to operating electromagnet *d* of minor switch RS1 over a circuit extending from the positive terminal of the battery BA through electromagnet *d* of RS1, wire conductor W2, closed contacts of switch MS1 and ground back to the negative terminal of battery BA. This will cause the wiper arm *f* of RS1 to be rotated to the first contact position of that switch so as to connect wire conductor W1 through that wiper arm and contact to the operating electromagnet *d* of major switch RS2. For dialing 1507, first the digit "1" is dialed in the usual manner to close the number contacts F of DM once, so that one impulse from battery BA will be sent over wire conductor W1 and through the closed wiper arm *f* and first contact position of RS1 to operatively energize electromagnet *d* of major switch RS2 causing the operation of that switch to its first switch contact position 1. In this manner the "thousands" group has been dialed. Due to the coupling between the two sets of contacts of DM, the dialing of this first digit will cause near the end of the turn of the dial, that is, near the end of the dialing cycle, the zero contacts Z to be closed momentarily to cause the sending out of a single current impulse over wire conductor W2 to operatively energize the operating electromagnet *d* of the minor switch RS1 causing its wiper arm *f* to be rotated one step farther, that is, to the second switch contact position 2. This switches on the "hundreds" group. The next digit dialed will be "5." The dialing of this digit in the usual manner will cause five closures of the F contacts of DM, so as to transmit five current impulses through W1 and the closed wiper arm and second contact position of switch RS1 to operatively energize operating electromagnet *d* of the major rotary switch RS3. This will result in the rotation of the wiper arm *f* of the latter switch to the fifth contact position 5. Simultaneously, with the dialing of the digit "5," the zero contacts Z of DM will be closed once to transmit a single current impulse over W2 to operatively energize the operating electromagnet *d* of minor switch RS1 causing the rotation of the wiper arm $f$ of that switch to its next contact position, that is, to the third contact, so that the "tens" group in the dialed number is effecively switched on. The next digit dialed will be zero. When this digit is dialed, no impulses will be transmitted over W1 through the contact F of DM and minor switch RS1, and the operating electromagnet $d$ of the major switch RS4 will remain unenergized and the wiper arm $f$ of that relay will remain on its zero (null) contact. However, when the zero digit is dialed, one impulse will be sent out over wire conductor W2 through the zero contacts Z of DM to operatively energize the operating electromagnet $d$ of the minor switch RS1 at the controlled station A once, so as to cause the rotation of the wiper arm $f$ of that switch to the next step position, that is to the fourth contact. Then the last digit "7" in the number will be dialed, which will cause seven closures of the contacts F of DM so as to cause the sending out of seven current impulses over the wire conductor W1 through the wiper arm $f$ and fourth contact of switch RS1 to operatively energize the operating electromagnet $d$ of major switch RS5 causing its wiper arm $f$ to be stepped to the seventh contact position 7. The dialing of the digit 7 at control station B also causes the closure of the zero contacts Z of DM once to send out a single current impulse over wire conductor W2 to operatively energize the operating electromagnet $d$ of minor switch RS1 causing the rotation of its wiper arm $f$ another step to the fifth contact position.

The frequency selection equipment FSE controlled through the operated contacts of the major switches RS2, RS3, RS4, RS5 . . . at the controlled station may be of any suitable type; for example, as shown within the box labeled FSE, it may consist of a plurality of groups of ten piezoelectric crystals each respectively designated in the several groups C1 to C10, C11 to C20, C21 to C30, C31 to C40, . . . these crystals being resonant at respectively different frequencies the values of which for corresponding crystals in different groups are related in different powers of ten. For example, the crystals C1 and C2 in the first group may be resonant at 1100 and 1200 megacycles, respectively; the crystals C11 and C12 in the second group at 110 and 120 megacycles, respectively; the crystals C21 and C22 in the third group at 11 and 12 megacycles, respectively; and the crystals C31 and C32 in the fourth group at 1.1 and 1.2 megacycles, respectively. One terminal of each of the crystals in each group is connected directly to ground. The other terminals of the crystals in each group are respectively connected as shown directly to a different one of the ten contacts in the contact bank $g$ of a different one of the major switches RS2, RS3, RS4, RS5, . . . The pivoted ends of the wiper arms $f$ of the major switches RS2, RS3, RS4, RS5, . . . are all connected to a common point P which, for example, may be connected as shown directly to the control grid of a vacuum tube VT in one stage of an amplifier in radio equipment contained within the dash-line box so labeled in Fig. 1, the tuning of which is to be controlled from remote station B. Thus, for the particular number 1507 dialed at remote control station this results in the respective wiper arms $f$ of the major switches RS2, RS3, RS4, RS5 . . . making contact with the first, fifth, zero and seventh contact position, respectively, of their respective contact banks. For this condition of the switches, as indicated in Fig. 1, the crystal C1 resonant at 1000 megacycles, the crystal C15 resonant at 150 megacycles and the crystal C37 resonant at 1.7 megacycles will be connected in parallel through contacting wiper arms and contacts of the major relays RS2, RS3 and RS5 between ground and the common point P so as to be effective in the control grid-cathode circuit of the tube VT in the radio equipment to tune the control grid-cathode circuit of that tube to a particular frequency determined by the combined resonant frequencies of the parallel connected crystals. It is apparent that by means of the system of Fig. 1 described, any desired frequency in the order of magnitude of megacycles, kilocycles or cycles may be easily dialed.

After a particular number has been dialed at the remote control station B to select a particular frequency or frequency channel at the controlled station in the manner described above, the system may be conditioned for operation by the next number dialed by the operator by pressing the manual switch MS2 at station B causing operating voltages to be applied from the battery BA over the wire conductor W3 to the clearing electromagnets $e$ of the minor switch RS1 and the major switches RS2, RS3, RS4, RS5 . . . This will cause the holding pawl $c$ and the ratchet-pawl $b$ of each of these switches to be retracted thereby releasing these switches so as to allow the wiper arms $f$ of the respective switches to be returned to the null contact $n$ by the action of the spring associated with each wiper arm.

Figure 2:
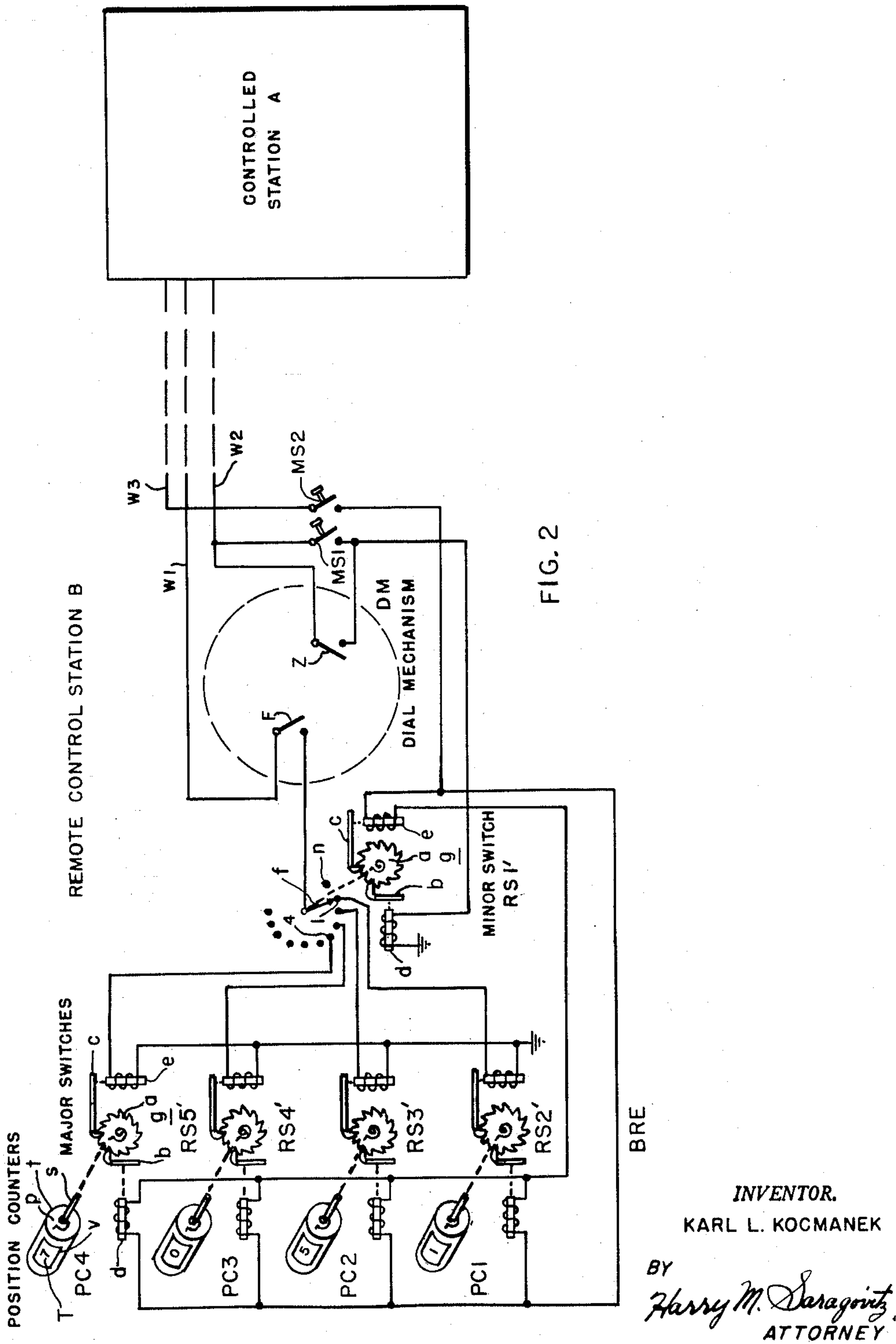
Fig. 2 shows schematically a similar "three-wire" impulse-controlled selector system for this purpose employing additional equipment at the remote control point for visibly indicating to the operator thereat the operating condition of the control equipment at that point.

The system of Fig. 2 differs from that of Fig. 1 merely in the addition at the remote control station B of back reporting equipment BRE connected so as to be controlled by the dialing mechanism DM and the associated manual switches MS1 and MS2 at that station in the same way that they control the switching equipment at the controlled station, for the purpose of providing an indication at station B of the operating condition of the switching equipment at station A which should have been produced by the dialing and switching operations at that station. By this means, not only can a check be made on the number dialed, but also a check on the operation of the selecting equipment at the controlled station.

The additional equipment BRE at station B comprises a duplicate of the switching equipment at station B including one minor rotary switch and a plurality of major rotary switches, as indicated by the use of the same reference characters for identifying corresponding switches at the two stations but followed by prime (′) marks in the case of the switching equipment at station B, except that the construction of each of the major rotary switches RS2′, RS3′, RS4′, RS5′ . . . at station B is modified to employ one of the significant position counters PC1, PC2, PC3, PC4 . . . , respectively, in place of the pivoted wiper arm $f$ and associated bank $g$ of switching contacts used in the corresponding major switches at the controlled station A.

Each of the position counters PC1, PC2, PC3, PC4 comprises a rotatable spring-retracted drum $p$ containing on the outer surface thereof the numbers 0 to 9, having a centrally-located shaft $s$ and an outer stationary covering shell $t$ with a window $v$ therein. The shaft $s$ of the drum $p$ is connected to and coaxial with the shaft of the ratchet wheel $a$ of the associated one of the major switches RS2′, RS3′, RS4′, RS5′ . . . so as to be rotatable therewith. The numbers 0 to 9 are so spaced consecutively on the outer surface of each counter drum $p$ that when the drum is rotated by its shaft $s$ in response to rotation of the shaft of the ratchet wheel $a$ of the associated major switch, the number 1 may be seen through the window $v$ when the wiper arm $f$ of that switch is rotated to the first contact position in the contact bank $g$ of the switch; the number 2 may be seen through the window $v$ when the wiper arm $f$ of the switch is rotated to the second switch contact, the number 3 may be seen through the window $v$ when the wiper arm $f$ of the switch is rotated to the third contact, and so on. The shaft of each major switch RS2′, RS3′, RS4′, RS5′ is rotated under control of the operating electromagnet $d$ of the switch when it is energized by a corresponding number of dialing impulses from the dialing mechanism DM transmitted through the associated operated contacts of the minor switch RS1′ in a manner similar to that described above for the corresponding switching equipment at the controlled station A under control of the dialing mechanism DM at the remote control station B. Thus, the current impulses from the dialing mechanism DM that control the actuation of the frequency selecting switching equipment FSE at the controlled station A also control the actuation of the indicating mechanism BRE at the remote control station B.

Figure 3:
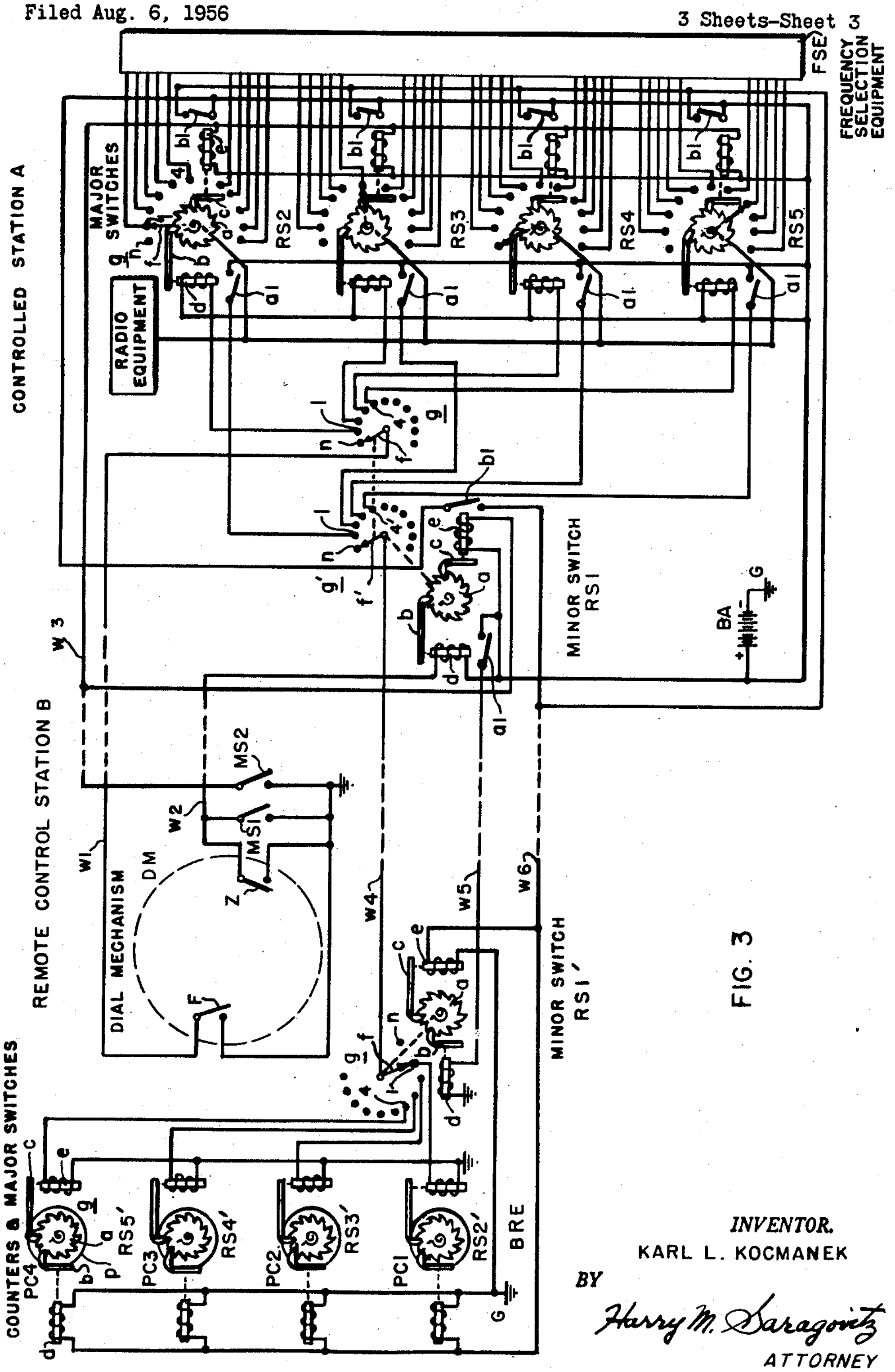
Fig. 3 shows schematically a "six-wire" impulse-controlled selector system in accordance with the invention, for selecting particular frequencies or channels from a remote point, and for automatically indicating at the remote point the operating condition of the selecting equipment at the controlled point.

The embodiment of the system of the invention shown in Fig. 3 differs from the embodiment of Fig. 2 merely in the use of additional wiring connections between the remote control station A and the controlled station B, and the modification of the switching equipments at stations A and B such as to enable the control of the switching equipment and thus the indicating equipment at the remote station A by impulses returned over the additional wiring connections to the control station B from the controlled station A under control of the switching equipment at the latter station.

In the system of Fig. 3, the additional wiring connections between stations A and B are the three wire conductors W4, W5 and W6. The modification of the switching equipment at station A includes modification of the minor switch RS1 thereat to provide an additional wiper arm *f'* ganged with the existing wiper arm *f*, and a second bank *g'* of ten switching contacts over which the wiper arm *f'* is rotated in synchronism with the wiper arm *f*. The modification of the switching equipment at station A also includes the provision of an individual set of servo contacts *a*1 on the minor switch RS1 and each of the major switches RS2, RS3, RS4, RS5 . . . respectively controlled by the operating electromagnet *d* of the associated switch, and the provision of an individual set of servo contacts *b*1 on the minor switch RS1 and each of the major switches RS2, RS3, RS4, RS5 . . . respectively controlled by the clearing electromagnet *e* of the associated switch. At station A, the wire conductor W4 is connected directly to the pivoted end of the wiper arm *f'* of the minor switch RS1; the wire conductor W5 is connected through the servo contacts *a*1 of the operating electromagnet *d* of minor switch RS1, and battery BA to ground; and the wire conductor W6 is connected through the parallel-connected servo contacts *b*1 of the clearing electromagnets *e* of the minor switch RS1 and the major switches RS2, RS3, RS4, RS5 . . . and battery BA in series to ground.

At the remote control station B, the wiring conductors W1, W2 and W3, are respectively connected to ground through the contacts F of DM, the contacts Z of DM and the manual switch MS1 in parallel therewith, and manual switch MS2, respectively, as in station B of Fig. 1. At station B of Fig. 3, the wire conductor W4 is connected directly to the pivoted end of the wiper arm *f* of the minor switch RS1'; the wire conductor W5 is connected through the operating electromagnet *d* of the minor switch RS1' to ground; and the wire conductor W6 is connected through the clearing electromagnets *e* of the minor switch RS1' and the major switches RS2', RS3', RS4', RS5' . . . in parallel to ground.

The operation of the system of Fig. 3 will now be described. The operation of that system as regards the equipment therein corresponding to that used in the systems of Figs. 1 and 2 is the same as described above in connection with the latter figures.

As previously described in connection with Fig. 1, the stepping of the wiper arm *f* of minor switch RS1 at station A to each of different contact positions on its bank *g* under control of an operating voltage or zero impulse applied to its operating electromagnet *d* over the wire conductor W2 when the manual switch MS1 is operated, or when the dialing contacts Z are operated during the dialing of each consecutive digit of a dialed number, respectively, results in the connection of an operating circuit from battery BA for the operating electromagnet *d* of each of the major switches RS2, RS3, RS4, RS5 . . . through respectively different operated contact positions of switch RS1, wire conductor W1, the contacts F of the dialing mechanism DM and the ground return path; and this will allow the operation in turn of the major switches RS2, RS3, RS4, RS5 . . . by dialing impulses corresponding to each consecutive dialed number digit subsequently transmitted through the circuit above traced, to respective contact positions on the contact banks *g* of these switches, representing different consecutively dialed digits in a dialed number.

The wiper arm *f'* of minor switch RS1 at station A, ganged with wiper arm *f* thereof, will be simultaneously stepped by operation of the operating electromagnet *d* of that switch to corresponding contact positions on the contact bank *g'*. Each operation of the operating electromagnet *d* of switch RS1 will also cause closure of the associated servo contacts *a*1 to connect battery BA to the operating electromagnet *d* of the minor switch RS1' at station B over a circuit including these contacts, wire conductor W5, and ground, causing each closure of *a*1 the transmission of a current impulse from battery BA over W5 to the latter electromagnet. The consequent operations of the relay RS1' will cause its wiper arm *f* to be stepped to contact positions on the associated contact bank *g* corresponding to those to which the wiper arms *f* and *f'* of switch RS1 at station A are stepped by the operation of the operating electromagnet *d* of the latter switch on the associated contact banks *g* and *g'* respectively.

Each contact position on the contact bank *g'* of minor switch RS1 at station A is connected through the servo contacts *a*1 of a different one of the major switches RS2, RS3, RS4, RS5 . . . at that station and the battery BA to ground, so that each time the servo contacts *a*1 of one of these major switches are closed by operation of the associated operating electromagnet *d*, an operating circuit is closed from the positive terminal of battery BA through these contacts, the associated contact position on contact bank *g'* of minor switch RS1, the wiper arm *f'*, wire conductor W4, wiper arm *f* of the minor switch RS1' at station B, a contact position on the contact bank *g* of that switch corresponding to that to which the wiper arm *f'* of switch RS1 is stepped at station A, the operating electromagnet *d* of the particular one of the major switches RS2', RS3', RS4', RS5' connected to that contact position of switch RS1', and ground back to the negative terminal of battery BA. This will cause the transmission of an operating impulse from battery BA back over the circuit traced above to the operating electromagnet *d* of a particular one of the major switches RS2', RS3', RS4', RS5' at station B to rotate its ratchet wheel *a* to a position corresponding to that of the ratchet wheel *a* of the controlling one of the major switches RS2, RS3, RS4, RS5 . . . at station A. In the manner described in detail in connection with the similar apparatus in Fig. 2, the rotation of the ratchet wheel of an operated one of the major switches RS2', RS3', RS4', RS5 at station B will cause a corresponding rotation of the drum *p* of the position counters PC1, PC2, PC3, PC4 associated with that particular switch, to provide an indication through the associated window *v* of the number of the contact position to which the wiper arm *f* of the controlling major switches, RS2, RS3, RS4, RS5, at station A has been operated.

In the system of Fig. 3, as in the system of Fig. 1, at the station A the clearing magnet *e* of the minor switch RS1 and the clearing magnets *e* of the major switches RS2, RS3, RS4, RS5 . . . are connected in parallel with each other between the wire conductor W3 and the positive terminal of the battery BA having its negative terminal grounded, and at station B the manual switch MS2 is connected between the wire conductor W3 and ground, so that the closure of switch MS2 by the operator at station B applies an operating voltage to the clearing electromagnets *e* of all the switches RS1, RS2, RS3, RS4, RS5 . . . causing their respective ratchet-operating pawls *b* and holding pawls *c* to be retracted to release the respective switches allowing their respective wiper arms *f* to return to the null contact *n*. The operation of the clearing magnets *e* of each of these switches RS1, RS2, RS3, RS4 will also cause the closure of individual servo contacts $b1$ which are connected in parallel with each other between the wire conductor W6 and the positive terminal of the battery BA having its negative terminal grounded. At the remote control station B the clearing magnet $e$ of the minor switch RS1′ and the clearing magnets $e$ of the major switches RS2′, RS3′, RS4′, RS5′ . . . are connected in parallel with each other between the wire conductor W6 and ground. Thus, when manual switch MS2 is closed to cause the release of the minor and major switches RS1, RS2, RS3, RS4, RS5 . . . at the controlled station A, because of the simultaneous actuation of the individual servo contacts $b1$ on the clearing electromagnets $e$ of these switches, an operating voltage will be simultaneously applied across the clearing electromagnets $e$ of each of the minor and major switches RS1′, RS2′, RS3′, RS4′, RS5′ at station B over wire conductor W6 from the battery BA causing the retraction of their ratchet and holding pawls to release the latter switches also. This will provide an indication at the control station B of the unoperated condition of the minor and major switches at the controlled station A by causing the wiper arm $f$ of the minor switch RS1′ to return to its null contact, and position counters PC1, PC2, PC3, PC4 associated with the major switches RS2′, RS3′, RS4′, RS5′, respectively, to return to the unoperated condition.

In the manner described, a correct indication will be provided at the remote control station of the operating condition of all the switching equipment at the controlled station. It is apparent that the system will be much less costly than other systems for the purpose in the prior art using servo motors or relay combinations. The separate elements can easily be changed when the indication equipment shows that any of them are not operating properly, and it is easy to locate defective parts.

Various changes in the system illustrated in the drawings and described above which are within the spirit and scope of the invention will occur to persons skilled in the art.

What is claimed is:

1. A system for selecting at a given point any one of a large number of available frequencies or frequency channels up to at least a billion, from another point relatively remote from said given point, comprising: three transmission circuits each consisting of an individual wire conductor and a common ground return path, extending between said remote and given points; a dial impulse sender at said remote point including means responsive to the dialing of each zero digit in the number assigned to any one of the frequencies or channels to be selected, to send out a single current impulse over a first one of said individual conductors to said given point, other means responsive to the dialing of each number digit in the assigned number to send out a series of one or more current impulses in number determined by the number of the digit dialed, over a second one of said individual conductors to said given point and means controlled by the operation of said other means for causing a single current impulse for each dialed number digit to be sent over said first individual conductor to said given point; switching equipment at said given point comprising a plurality of step-by-step switches each having a plurality of consecutively numbered step contact positions, one of which switches is connected to said first conductor so as to be operated under control of each of the successive single impulses received thereover from said remote point, one step for each impulse, to respectively different numbered contact positions determined by the position of the particular digit in the dialed number producing the controlling impulse, and each of the others of which switches is connected through a different one of the operated contact positions of said one switch, when it is operated to that contact position, to said second conductor so as to be operated in response to a different one of the series of impulses received thereover to a numbered contact position determined by the number of impulses therein which corresponds to the number of the dialed digit producing that series of impulses; frequency selective means controlled by said other switches through the operated contact positions thereof to select the particular frequency or frequency channel assigned to the number dialed at said remote point; and manual switch means at said remote point which, when operated, will cause the application over a third one of said conductors of a control voltage to all of the switches at said given point such as to cause their release to the unoperated condition.

2. A system for accurately selecting at one station any desired one of a large number of available frequencies or frequency channels up to at least a billion, from another station relatively remote from said one station comprising: three transmission circuits each including an individual wire conductor and a common ground return path, for connections between the two stations; a dial impulse sender at said remote station, including means responsive to the dialing of each zero digit in a number assigned to any one of the frequencies or channels to be selected, to cause the transmission of a single current impulse over a first one of said conductors to said one station, other means responsive to the dialing of each number digit in the assigned number to cause the transmission of a different series of impulses in number determined by the number of the digit dialed, over a second one of said conductors, and means controlled by each operation of said other means for causing a single current impulse for each dialed number digit to be sent over said first conductor, to said one station; a plurality of step-by-step switches at said one station each having a plurality of consecutive switch contact positions, one of said switches being operated in turn to its different consecutive contact positions in response to the first, second, third, etc., respectively, of the single impulses consecutively received over said first conductor during a dialing period, and the others of said switches being respectively operated through the first, second, third, etc., operated contact positions of said one switch in response to the first, second, third, etc., series of impulses respectively produced by consecutive digits in the dialed number, received over said second conductor, to different numbered switch contact positions depending on the number of impulses in the controlling series and thus on the number of a different one of the digits in the dialed number; frequency selective means controlled by said other switches through the operated contact positions thereof to select the particular frequency or channel designated by the number dialed; manual switching devices at said remote station for respectively controlling over said first conductor the operation of said one switch to its first contact position and over the third one of the conductors the release of all said step-by-step switches at said one station to the unoperated condition; and switch operation indicating means at said remote station.

3. The system of claim 2, in which said one switch is operated to its first contact position by a single current impulse transmitted thereto over said one conductor just prior to the dialing of a number at said remote station, under control of one of said manual switching devices at that station, and is operated to its other contact positions by respectively different ones of the other single current impulses produced in response to the dialing of each digit in the dialed number, and transmitted to said one switch over said one conductor.

4. The system of claim 2, in which said means at said remote station for controlling the release of all the step-by-step switches at said one station to the unoperated condition comprises a manual switching device having its normally-open switch contacts connected in series with said third conductor and which, when its switch contacts are operated to the closed condition, causes the application over that conductor of a clearing voltage to all of said step-by-step switches.

5. The system of claim 2, in which said switch operation indicating means at said remote station comprises a plurality of step-by-step switches similar to said one and said other switches at said one station, and connected to the same conductors of the transmission circuits between the two stations in similar manner, except for the use of position counters instead of a plurality of contact positions, associated with the particular switches at the remote station corresponding to said other switches at said one station, the switches in said switch operation indicating means at said remote station are actuated by different energy portions of the same impulses that actuate the corresponding switches at said one station, returned over said common ground return path to said remote station, the position counter of each of the switches at said remote station corresponding to said other switches at said one station being responsive to operation of the associated switch to provide visible indication of the number of the contact position to which the corresponding other switch at said one station has been operated by the impulses received from said remote station.

6. The system of claim 2, in which the circuit connections between said one and said remote station includes three additional wire conductors which with said common ground return path provide three additional transmission circuits between these stations, said switch operation indicating means at said remote station comprises a plurality of step-by-step switches similar to said one and said other switches at said one station, except for the use of position counters instead of a plurality of contact positions, associated with the switches corresponding to said other switches at said one station, each of the step-by-step switches at said one station has a set of servo contacts which, when the associated switch operates in response to an impulse or series of impulses received over said one or said second conductor from said remote station, causes a corresponding impulse or series of impulses to be sent over one of said additional three conductors to produce corresponding operation of the corresponding step-by-step switch at said remote station, the operation of each of the step-by-step switches at said remote station corresponding to said other switches at said one station, causing the operation of the associated position counter to provide thereon a visible indication of the number of the switch contact position to which the corresponding one of said other switches at said one station has been operated.

7. The system of claim 1, in which said dial impulse sender at said remote point includes a set of zero dialing contacts and a set of number dialing sets of contacts and means coupling these contacts such that during the dialing of each number digit to close said number contacts a number of times determined by the number of that digit, said zero dialing contacts will be closed once; a battery having its negative terminal grounded is provided at said given point; each of the step-by-step switches at said given point includes an operating winding, a clearing winding, a pivoted wiper arm and a bank of consecutively numbered contacts; said one conductor being connected at said given point through the operating winding of said one switch to the positive terminal of said battery and being connected at said remote point through said zero dialing contacts to ground; so that the consecutive closures of said zero contacts of said impulse sender in response to the dialing of a zero digit or a number digit will cause the application over said one conductor of consecutive energizing current impulses from said battery to the operating winding of said one switch causing the operation of that switch to step its wiper arm, one step for each impulse, to respectively different ones of the numbered contacts on its contact bank; said second conductor being connected at said given point through the wiper arm and a respectively different operated contact of said one switch, when it is operated to that contact, and the operating winding of a different one of said other switches to the positive terminal of said battery, and being connected at said remote point through the number contacts of said impulse sender to ground, so that the consecutive closures of said number contacts of said impulse sender in response to each dialed number digit will cause the application of a different series of energizing current impulses in number determined by the number of that digit over said second conductor to the operating winding of a different one of said other switches causing the operation of that switch to step its wiper arm to a number contact on its contact bank determined by the number of impulses in the controlling impulse series; said third conductor being connected at said given point through the clearing windings of all of said step-by-step switches in parallel to the positive terminal of said battery, and being connected at said remote point through the normally-open contacts of said manual switch means to ground, so that each operation of said manual switch means to close its switch contacts will cause the application of an operating voltage from said battery to the clearing windings of all said step-by-step switches to release these switches so that they will be returned to the unoperated condition.

References Cited in the file of this patent

UNITED STATES PATENTS

| | | |
|---|---|---|
| 2,457,149 | Herbst | Dec. 28, 1948 |
| 2,483,445 | Talley | Oct. 4, 1949 |